(12) United States Patent
Hikosaka

(10) Patent No.: US 10,605,994 B2
(45) Date of Patent: Mar. 31, 2020

(54) OPTICAL CONNECTOR

(71) Applicant: YAZAKI CORPORATION, Tokyo (JP)

(72) Inventor: Tomohiro Hikosaka, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/992,344

(22) Filed: May 30, 2018

(65) Prior Publication Data

US 2018/0348442 A1 Dec. 6, 2018

(30) Foreign Application Priority Data

May 31, 2017 (JP) ................................. 2017-107522

(51) Int. Cl.
*G02B 6/38* (2006.01)
*G02B 6/36* (2006.01)

(52) U.S. Cl.
CPC ........... *G02B 6/3847* (2013.01); *G02B 6/381* (2013.01); *G02B 6/3855* (2013.01); *G02B 6/3632* (2013.01); *G02B 6/3834* (2013.01); *G02B 6/3861* (2013.01); *G02B 6/3869* (2013.01); *G02B 6/3874* (2013.01); *G02B 6/3885* (2013.01)

(58) Field of Classification Search
CPC .... G02B 6/381; G02B 6/3834; G02B 6/3847; G02B 6/3861; G02B 6/3869; G02B 6/3874

See application file for complete search history.

(56) References Cited

U.S. PATENT DOCUMENTS

| 4,186,999 | A | * | 2/1980 | Harwood | G02B 6/3835 257/98 |
| 4,859,827 | A | * | 8/1989 | Coyle, Jr. | B23K 26/22 219/121.64 |
| 5,177,808 | A | * | 1/1993 | Satake | G02B 6/3814 385/70 |
| 6,817,779 | B2 | * | 11/2004 | Endo | G02B 6/3855 385/78 |
| 6,902,327 | B1 | * | 6/2005 | Johnson | G02B 6/3887 385/60 |
| 6,960,027 | B1 | * | 11/2005 | Krah | G02B 6/3855 385/78 |
| 8,876,402 | B2 | | 11/2014 | Hikosaka | |

(Continued)

FOREIGN PATENT DOCUMENTS

| JP | S60-150508 U | 10/1985 |
| JP | H04-097106 A | 3/1992 |

(Continued)

*Primary Examiner* — Daniel Petkovsek
(74) *Attorney, Agent, or Firm* — Metrolex IP Law Group, PLLC

(57) ABSTRACT

An optical connector includes: an optical fiber; a ferrule provided at an end of the optical fiber, through which a core wire of the optical fiber is inserted; a housing 9 configured to accommodate the ferrule; a fiber end face provided in the core wire of the optical fiber, located inside the ferrule from an end face of the ferrule in a state where the core wire is inserted through the ferrule; and a fixing means provided between an outer periphery of the core wire and an inner periphery of the ferrule, the fixing means configured to fix the core wire of the optical fiber to the ferrule and to fix a position of the fiber end face.

4 Claims, 7 Drawing Sheets

(56) References Cited

U.S. PATENT DOCUMENTS

| | | | |
|---|---|---|---|
| 2002/0028047 A1* | 3/2002 | Yasuda | G02B 6/2552 |
| | | | 385/79 |
| 2003/0174974 A1* | 9/2003 | Yasuda | G02B 6/3807 |
| | | | 385/80 |
| 2008/0292244 A1* | 11/2008 | Kato | G02B 6/02366 |
| | | | 385/50 |
| 2013/0163930 A1 | 6/2013 | Jian | |
| 2013/0177278 A1* | 7/2013 | Guo | G02B 6/3826 |
| | | | 385/72 |
| 2018/0335580 A1* | 11/2018 | Lohse | G02B 6/3861 |

FOREIGN PATENT DOCUMENTS

| | | | | |
|---|---|---|---|---|
| JP | H08-021929 A | | 1/1996 | |
| JP | 2000-321446 A | | 11/2000 | |
| JP | 2001166179 A | * | 6/2001 | ............ G02B 6/36 |
| JP | 2005345579 A | * | 12/2005 | ............ G02B 6/36 |
| JP | 2006113152 A | * | 4/2006 | ............ G02B 6/38 |
| JP | 2011-33849 A | | 2/2011 | |
| JP | 2014-44335 A | | 3/2014 | |
| JP | 2015059993 A | * | 3/2015 | ............ G02B 6/38 |

* cited by examiner

OPTICAL CONNECTOR

CROSS REFERENCE TO RELATED APPLICATIONS

The present application claims priority to Japanese Patent Application No. 2017-107522 filed on May 31, 2017, the entire contents of which are incorporated by reference herein.

BACKGROUND

1. Technical Field

The present invention relates to an optical connector, and more particularly to an optical connector in which a core wire of an optical fiber is inserted through a ferrule.

2. Description of the Related Art

As a conventional optical connector, there has been known an optical connector including an optical fiber, a ferrule provided at an end portion of the optical fiber and through which a core wire of the optical fiber is inserted, and a housing accommodating the ferrule (see JP 2014-44335 A (Patent Literature 1) and JP 2011-33849 A (Patent Literature 2)).

The housing of the optical connector is fitted to a housing of an opponent optical connector accommodating a ferrule into which a core wire of an optical fiber is inserted. With this fitting, an end face of the ferrule (hereinafter, referred to as "ferrule end face") accommodated in the housing comes into contact with an end face of a ferrule accommodated in an opponent housing, whereby the optical fibers are optically coupled to each other.

An optical connector disclosed in Patent Literature 1 includes a fiber stopper provided at an end face of the ferrule. The fiber stopper is a step portion forming a hole at the end face of the ferrule. The hole has a diameter smaller than a through hole through which a core wire of the optical fiber is inserted.

By the fiber stopper of the ferrule, an end face of the core wire of the optical fiber (hereinafter, referred to as "fiber end face") is brought into contact with the fiber stopper, a further insertion of the optical fiber into the ferrule is restricted, the fiber end face is positioned inside the ferrule from the ferrule end face. Accordingly, the fiber end face is not exposed from the ferrule end face.

Since the fiber end face is not exposed from the ferrule end face as described above, the end face of the optical fiber is not rubbed when a ferrule assembly of the optical fiber to which the ferrule is assembled is conveyed, or when the housing is fitted to an opponent housing. Accordingly, it is possible to prevent the fiber end face from being scratched.

In an optical connector of Patent Literature 2, a core wire of an optical fiber is inserted into a ferrule and is exposed from a ferrule end face of a ferrule. The ferrule end face from which the fiber end face of the core wire is exposed is polished to be a plane inclined at a predetermined angle.

Since the ferrule end face is inclined as described above, when the housing and an opponent housing are fitted to each other, a part of the ferrule end face comes into contact with a ferrule end face of an opponent ferrule. Nevertheless, end faces of optical fibers do not come into contact with each other. Accordingly, even when the housings are fitted to each other, the fiber end face is not rubbed. Accordingly, it is possible to prevent the fiber end face from being scratched.

SUMMARY

In the optical connector described in Patent Literature 1, an exposure of the fiber end face is prevented by the step portion provided in the ferrule. However, when the ferrule end faces are brought into contact with each other, step portions of respective ferrules intervene between the fiber end faces.

For this reason, a gap corresponding to a thickness of the step portions is formed between the fiber end faces. Although there are countermeasures such as thinning a thickness of each step portion, the countermeasures are also limited and an optical loss is affected by the thickness of the step portion.

In the connector described in Patent Literature 2, a gap between the fiber end faces can be narrowed even when the ferrule end faces are brought into contact with each other. However, since the fiber end face is exposed from the ferrule end face, the fiber end face may be scratched in a conveyance of the ferrule assembly or the like.

Accordingly, an object of the present invention is to provide an optical connector capable of suppressing optical loss and protecting the fiber end face.

An aspect of the present invention is an optical connector including: an optical fiber; a ferrule provided at an end of the optical fiber, through which a core fire of the optical fiber is inserted; a housing 9 configured to accommodate the ferrule; a fiber end face provided in the core wire of the optical fiber, located inside the ferrule from an end face of the ferrule in a state where the core wire is inserted through the ferrule; and a fixing means provided between an outer periphery of the core wire and an inner periphery of the ferrule, the fixing means configured to fix the core wire of the optical fiber to the ferrule and to fix a position of the fiber end face.

The fixing means may include a welded portion configured to fix the core wire of the optical fiber and the ferrule to each other.

The fixing means may include a bonding portion configured to bond the core wire of the optical fiber and the ferrule.

The fixing means may include a crimp portion which abuts to the core wire of the optical fiber by crimping the outer periphery of the ferrule.

According to the present invention, it is possible to provide an optical connector capable of suppressing optical loss and protecting the fiber end face.

DESCRIPTION OF THE EMBODIMENTS

Figure 1:
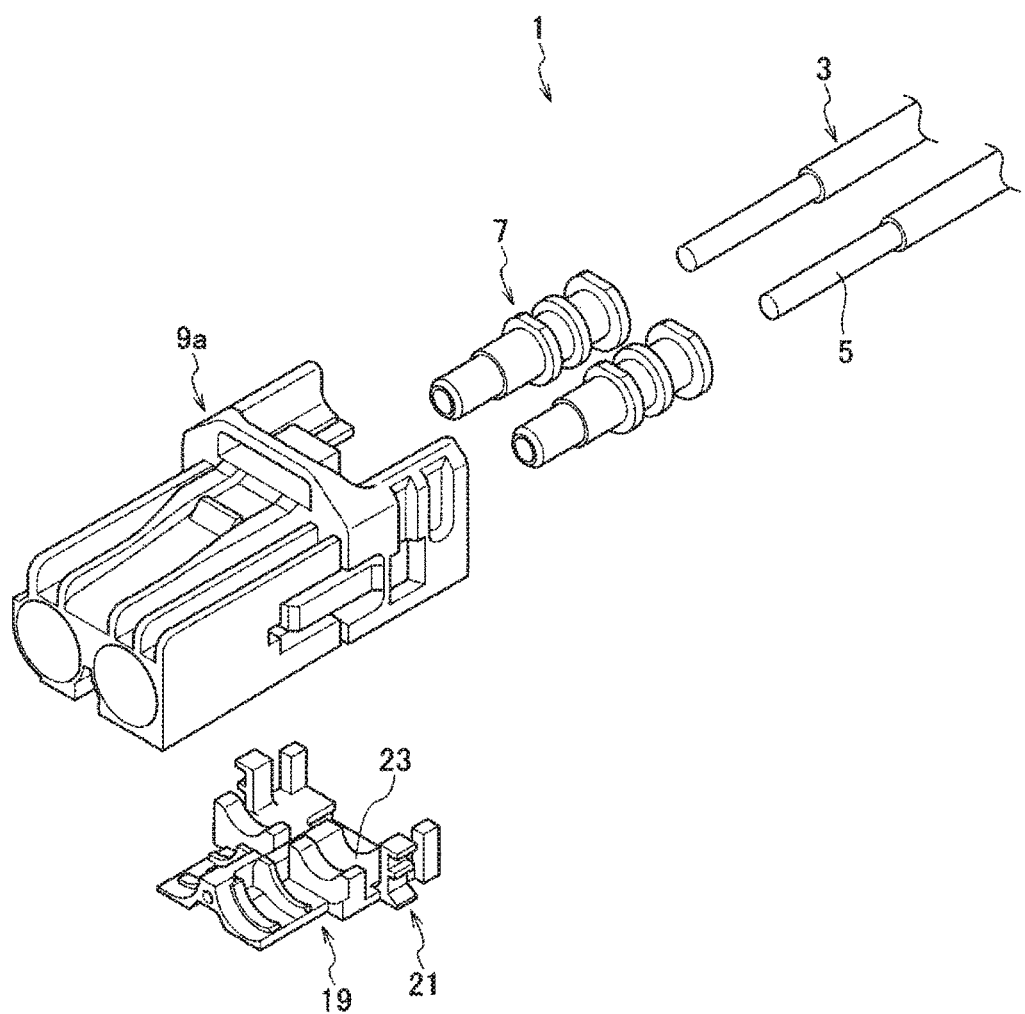
FIG. 1 is an exploded perspective view of a plug connector as an optical connector according to a first embodiment of the present invention.
Figure 2:
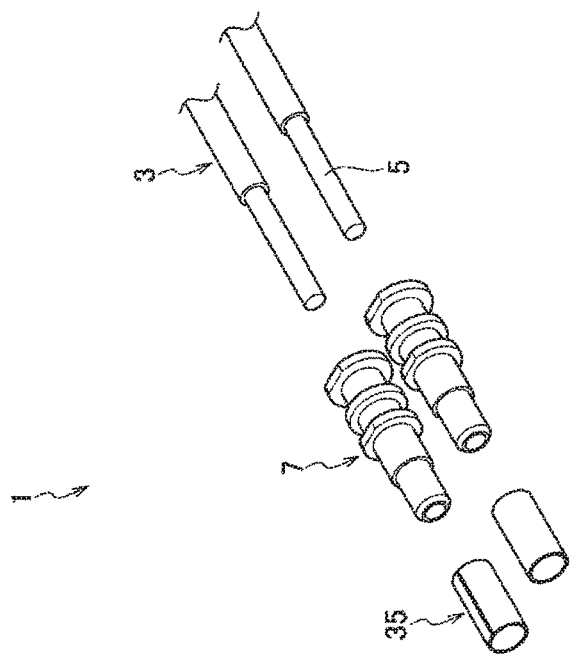
FIG. 2 is an exploded perspective view of a receptacle connector as an optical connector according to the first embodiment of the present invention.
Figure 2:
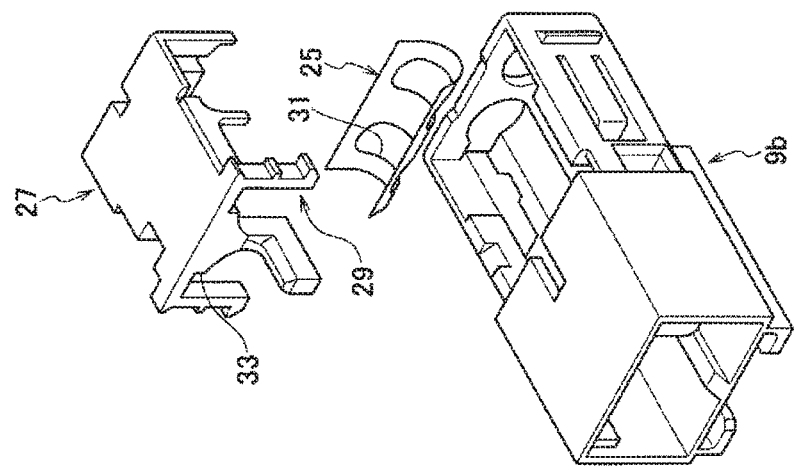
Figure 3:
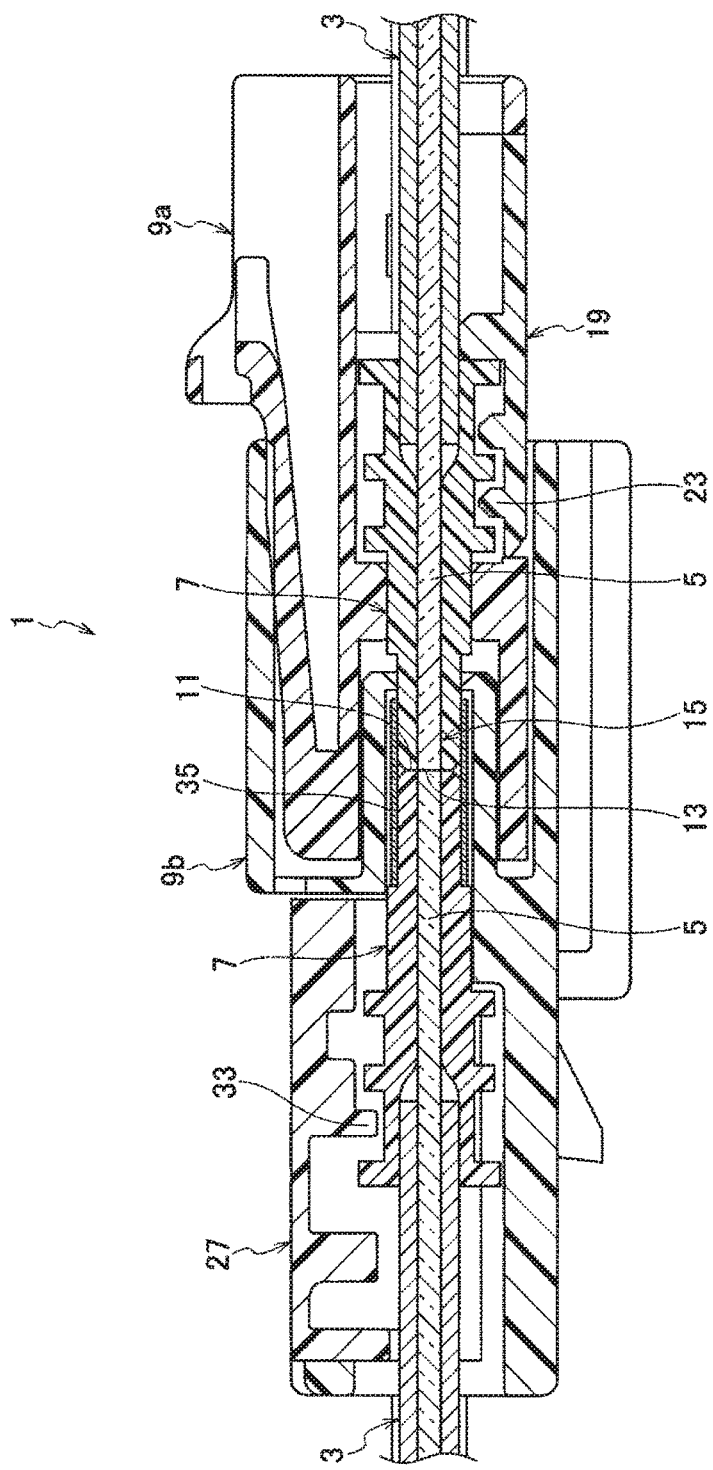
FIG. 3 is a sectional view of the optical connectors according to the first embodiment of the present invention.
Figure 4:
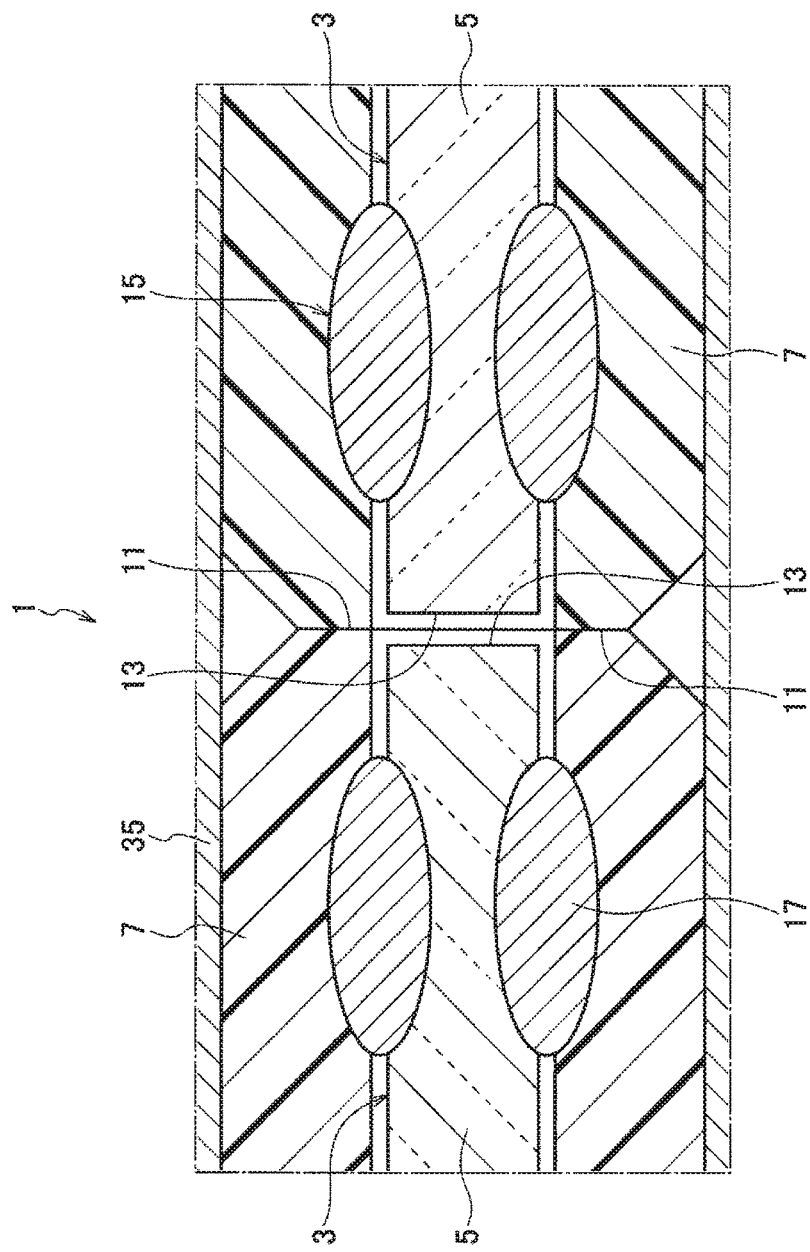
FIG. 4 is an enlarged sectional view of a main part of the optical connector according to the first embodiment of the present invention.

An optical connector according to an embodiment of the present invention will be described with reference to FIGS. 1 to 6.

First Embodiment

A first embodiment will be described with reference to FIGS. 1 to 4.

The optical connector 1 according to the present embodiment includes an optical fiber 3 with a core wire (core) 5 disposed therein, a ferrule 7 provided at an end of the optical fiber 3 through which the core wire 5 of the optical fiber 3 is inserted, and a housing 9 accommodating the ferrule 7.

An end face 13 (hereinafter, referred to as "fiber end face") is provided in the core wire 5. The fiber end face 13 is located inside the ferrule 7 from the end face 11 of the ferrule 7 (hereinafter, also referred to as "ferrule end face") in a state where the core wire 5 is inserted through the ferrule 7.

A fixing means 15 is provided between an outer periphery of the core wire 5 and an inner periphery of the ferrule 7. The fixing means 15 fixes the core wire 5 to the ferrule 7 and fixes a position of the fiber end face 13.

The fixing means 15 of the present embodiment is a welded portion 17 formed by melting at least one of a material of the ferrule 7 and a material of the core wire 5. The welded portion 17 closely contacts with the core wire 5 and the ferrule 7, and fixes the core wire 5 and the ferrule 7 to each other.

Figure 7:
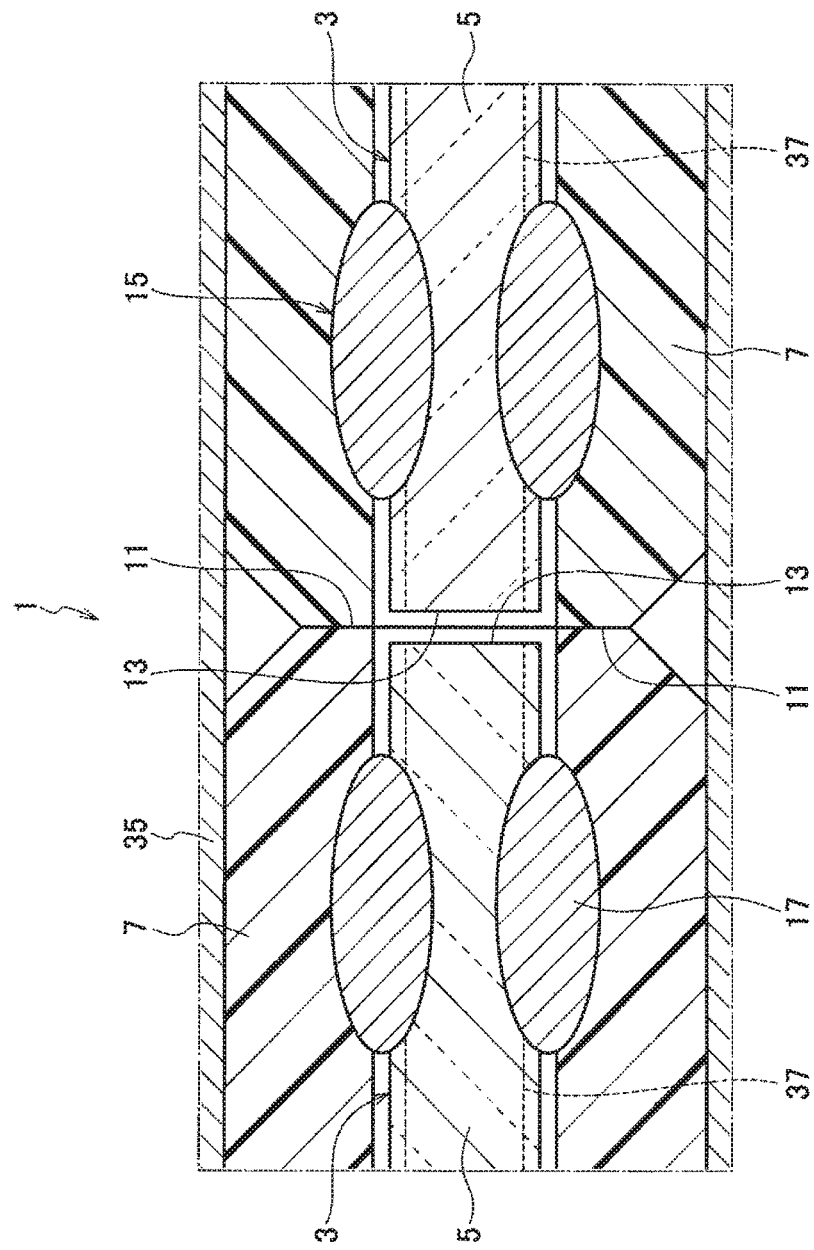
FIG. 7 is an enlarged cross-sectional view of a main part when a primary coating is integrated with a core wire of an optical fiber of the connector according to the embodiments of the present invention.

As shown in FIGS. 1 to 4, the optical fiber 3 is a solid construction optical fiber made of the sheathed core wire 5 which has a primary coating on its outer circumference (see FIG. 7). In the present embodiment, two optical fibers are attached to the optical connector 1.

One end of this optical fiber 3 is connected to an instrument or the like, and the other end is inserted into the ferrule 7. In the optical fiber 3 inserted into the ferrule 7, the core wire 5 is exposed.

The ferrule 7 is made of resin or metal. The core wire 5 is inserted into the ferrule 7 to form a ferrule assembly. A plurality (e.g. two) of the ferrules 7 may be arranged in parallel. In this case, the core wire 5 may be inserted into each of the ferrules 7 to form the ferrule assembly.

The ferrule assembly is polished by a polishing jig (not shown) for holding the ferrule assembly and a polishing disc (not shown) for polishing the end face 11 of the ferrule 7 or the like.

The ferrule 7 side of the ferrule assembly is accommodated in the housing 9.

The optical connector 1 according to the present embodiment serves as a plug connector having a housing 9a, or a receptacle connector having a housing 9b. The housings 9a and 9b are fitted to each other. The housings 9a and 9b accommodates ferrule assemblies having substantially same configurations.

The housing 9a is formed in a rectangular parallelepiped shape. The housing 9a accommodates at least one ferrule 7 in the interior. For example, the housing 9a accommodates a plurality (e.g. two) of ferrules 7 arranged in parallel.

The housing 9a has an opening on a bottom side of a portion in which the ferrule 7 is accommodated. A holder 19 is inserted into the opening and assembled to the housing 9a by a locking portion 21.

The holder 19 is formed in a rectangular parallelepiped shape. The holder 19 includes a ferrule holding portion 23 provided at a central portion in a width direction thereof. The ferrule holding portion 23 latches the ferrule 7 to prevent the ferrule assembly from coming off and holds the ferrule 7 in the housing 9a.

The locking portion 21 is configured hold the holder 19 at a temporary locking position and a full locking position with respect to the housing 9a. When the holder 19 is positioned at the temporary locking position, the ferrule 7 can be inserted into the housing 9a. When the holder 19 is positioned at the full locking position, the holder 19 holds the ferrule 7 in the housing 9a.

The housing 9a as the plug connector 9a is fitted to the housing 9b as the receptacle connector.

The housing 9b is formed in a tubular and rectangular parallelepiped shape so that the housing 9a can be fitted therein. The housing 9b accommodates at least one ferrule 7 in the interior. For example, the housing 9b accommodates a plurality (e.g. two) of ferrules 7 arranged in parallel.

The housing 9b has an opening on a top side of a portion in which the ferrule 7 is accommodated. A spring 25 and holder 27 are inserted into the opening and assembled to the housing 9b by a locking portion 29.

The spring 25 is formed in a U-shape. The spring 25 is provided with a ferrule engaging portion 31 formed in an elongated (slotted) hole shape extending in the longitudinal direction. The ferrule engaging portion 31 is engaged with the ferrule 7, and biases the ferrule 7 in a fitting direction of the housings 9a, 9b.

The spring 25 is prevented from being detached from the housing 9b by the holder 27 assembled to the housing 9b.

The holder 27 is formed in a rectangular parallelepiped shape. The holder 27 includes a ferrule holding portion 33 provided at the center portion in a width direction thereof. The ferrule holding portion 33 latches the ferrule 7 to prevent the ferrule assembly from coming off and holds the ferrule 7 in the housing 9b.

The locking portion 29 is configured hold the holder 27 at a temporary locking position and a full locking position with respect to the housing 9b. When the holder 27 is positioned at the temporary locking position, the ferrule 7 can be inserted into the housing 9b. When the holder 27 is positioned at the full locking position, the holder 27 holds the ferrule 7 in the housing 9b.

When the housing 9b is fitted to the housing 9a, the ferrule end faces 11, 11 abut to each other, and the fiber end faces 13, 13 face each other. At the position where the ferrules 7, 7 are in contact, the ferrules 7, 7 are inserted into a split sleeve 35, and optical axes of the ferrules 7, 7 are aligned. Accordingly, the optical fibers 3, 3 are optically coupled.

Since the ferrule 7 accommodated in the housing 9b is biased in the fitting direction of the housings 9a, 9b by the spring 25, the contact between the end faces 11, 11 of the ferrules 7, 7 can be reliably maintained. Accordingly, the optical coupling of the optical fibers 3, 3 can be stabilized.

In the ferrule assembly accommodated in each of the housings 9a, 9b, the fiber end face 13 of the core wire 5 is disposed inside the ferrule 7 from the end face 11 of the ferrule 7, and the position of the fiber end face 13 is fixed by the fixing means 15.

The fiber end face 13 of the core wire 5 is disposed at a position slightly drawn toward the inside of the ferrule 7 from the end face 11 of the ferrule 7.

By disposing the fiber end face 13 in this manner, the fiber end face 13 is not exposed from the ferrule end face 11 of the ferrule 7, and the fiber end face 13 does not interfere with other members in the conveyance of the ferrule assembly or the like. Accordingly, it is possible to prevent the fiber end face 13 from being scratched.

Since the housings 9a, 9b are fitted to each other and the end faces 11, 11 of the ferrules 7, 7 are in contact with each other, the fiber end faces 13, 13 do not rub against each other and are not worn away even when vibrations (for example, induced by running of a vehicle) occurs. Accordingly, it is possible to prevent the fiber end face 13 from being scratched.

As described above, the position of the fiber end face 13 with respect to the end face 11 of the ferrule 7 is fixed by the fixing means 15.

The fixing means 15 is provided between the outer periphery of the core wire 5 and the inner periphery of the ferrule 7. The fixing means 15 fixes the core wire 5 to the ferrule 7 and fixes the position of the fiber end face 13 with respect to the end face 11 of the ferrule 7.

The fixing means 15 is a welded portion 17, which is formed by welding at lease of the core wire 5 and the ferrule 7 by welding apparatus (not shown) such as laser welding.

The welding portion 17 as the fixing means 15 is provided between the outer periphery of the core wire 5 of the optical fiber 3 and the inner periphery of the ferrule 7. Therefore, even when the end faces 11, 11 of the ferrules 7, 7 are in contact, no inclusions are arranged between the fiber end faces 13, 13.

Therefore, by adjusting and fixing the position of the fiber end face 13 with respect to the end face 11 of the ferrule 7, it is possible to minimize the gap between the fiber end faces 13, 13 when the end faces 11, 11 of the ferrules 7, 7 are in contact. Accordingly, optical loss such as optical connection loss or the like can be minimized.

The fixing means 15 is a welded portion 17 formed from at least one of the core wire 5 and the ferrule 7. Therefore, the position of the fiber end face 13 with respect to the end face 11 of the ferrule 7 can be fixed without increasing the number of parts by using a separate member.

By the way, when the fiber end faces 13, 13 are in contact with each other and any one of the fiber end faces 13, 13 is damaged, a contact state and a non-contact state between the fiber end faces 13, 13 may irregularly occur due to the vibration as described above or the like.

If the contact state and the non-contact state of the fiber end faces 13, 13 would irregularly occur, the degree of optical loss would become unstable, the prediction of the optical loss would become difficult, and the communication through the optical fibers 3 would become unstable.

Therefore, the position of the fiber end face 13 with respect to the end face 11 of the ferrule 7 is set so that the optical loss due to the gap between the fiber end faces 13, 13 is set about 0.3 db when the end faces 11, 11 of the ferrules 7, 7 are in contact, as compared with the case where the fiber end faces 13, 13 are in contact.

By fixing the position of the fiber end face 13 with the fixing means 15 and setting the gap between the fiber end faces 13, 13 as describe above, the optical loss can be stabilized and the communication can be stabilized.

As described above, the fiber end face 13 is disposed inside the ferrule 7 from the end face 11 of the ferrule 7 in a state where the core wire 5 is inserted through the ferrule 7. Therefore, the fiber end face 13 is not exposed from the end face 11 of the ferrule 7.

Therefore, when the ferrule assembly is conveyed or the optical fibers 3, 3 are optically coupled to each other, rubbing or the like does not occur on the fiber end face 13, and damage on the fiber end face 13 can be prevented.

Between the outer periphery of the core wire 5 and the inner periphery of the ferrule 7, fixing means 15 for fixing the core wire 5 to the ferrule 7 and fixing the position of the fiber end face 13 is provided. Therefore, when the housings 9a, 9b are fitted to each other and the end faces 11, 11 of the ferrules 7, 7 are brought into contact with each other, there is no inclusion between the fiber end faces 13, 13.

Therefore, by adjusting the position of the fiber end face 13 from the end face 11 of the ferrule 7 when the optical fibers 3, 3 are optically coupled to each other, it is possible to minimize the gap between the fiber end faces 13, 13, and the optical loss can be minimized.

Therefore, in such an optical connector 1, since the position of the fiber end face 13 is fixed by the fixing means 15 provided between the outer periphery of the core wire 5 and the inner periphery of the ferrule 7, the optical loss can be suppressed, and the fiber end face 13 can be protected.

Further, the fixing means 15 is the welding portion 17 obtained by welding at least one of the core wire 5 and the ferrule 7.

Accordingly, the position of the fiber end surface 13 can be fixed by the welding portion 17 without increasing the number of parts.

Second Embodiment

A second embodiment will be described with reference to FIG. 5.

In an optical connector 101 according to the present embodiment, the fixing means 15 is an bonding portion 103 which bonds the core wire 5 and the ferrule 7.

Note that the same reference numerals are used for the same components as those of the first embodiment, and the description thereof is omitted. As to the same configuration as in the first embodiment is described in the explanation of the first embodiment, and the effect is the same as one obtained in the first embodiment.

Figure 5:
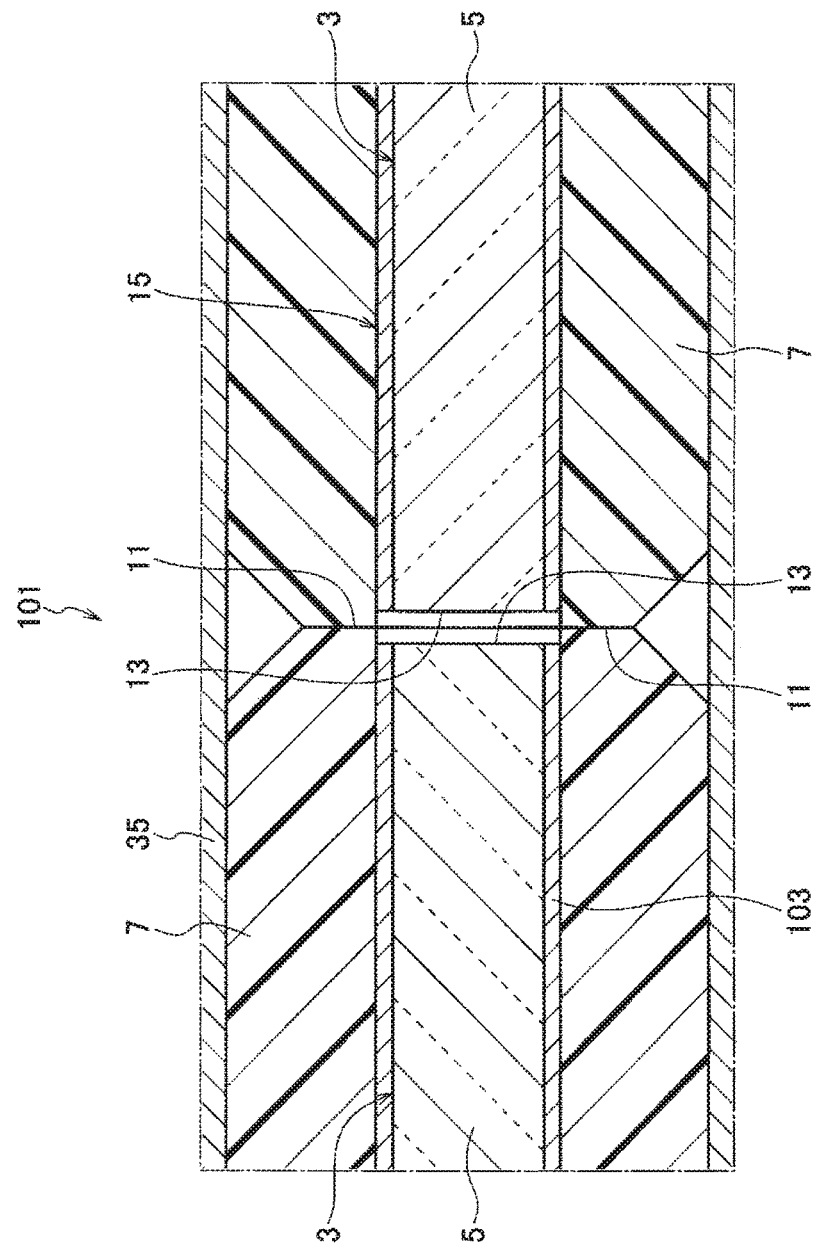
FIG. 5 is an enlarged sectional view of a main part of an optical connector according to a second embodiment of the present invention.

As shown in FIG. 5, the fixing means 15 is a bonding portion 103 provided between the outer periphery of the core wire 5 and the inner periphery of the ferrule 7.

The bonding portion 103 is made of adhesive applied between the outer periphery of the core wire 5 and the inner periphery of the ferrule 7.

The bonding portion 103 is provided, between the core wire 5 and the ferrule 7, in a range in a longitudinal direction where at least the split sleeve 35 into which the ferrules 7, 7 are inserted is positioned.

By fixing the position of the fiber end face 13 with the bonding portion 103 as the fixing means 15, the core wire 5 can be fixed to the ferrule 7 in a wide range in the longitudinal direction of the core wire 5 and the ferrule 7, whereby the position of the fiber end face 13 can be stably fixed.

In the optical connector 101, the fixing means 15 is the bonding portion 103 which bonds the core wire 5 and the ferrule 7. Accordingly, the bonding can be made over a wide range in the longitudinal direction, whereby the position of the fiber end face 13 can be stably fixed.

Third Embodiment

A third embodiment will be described with reference to FIG. 6.

In an optical connector 201 according to the present embodiment, the fixing means 15 is a crimp portion 203 which abuts to the core wire 5 by crimping the outer periphery of the ferrule 7.

Note that the same reference numerals are used for the same components as those of the first embodiment, and the description thereof is omitted. As to the same configuration as in the first embodiment is described in the explanation of the first embodiment, and the effect is the same as one obtained in the first embodiment.

Figure 6:
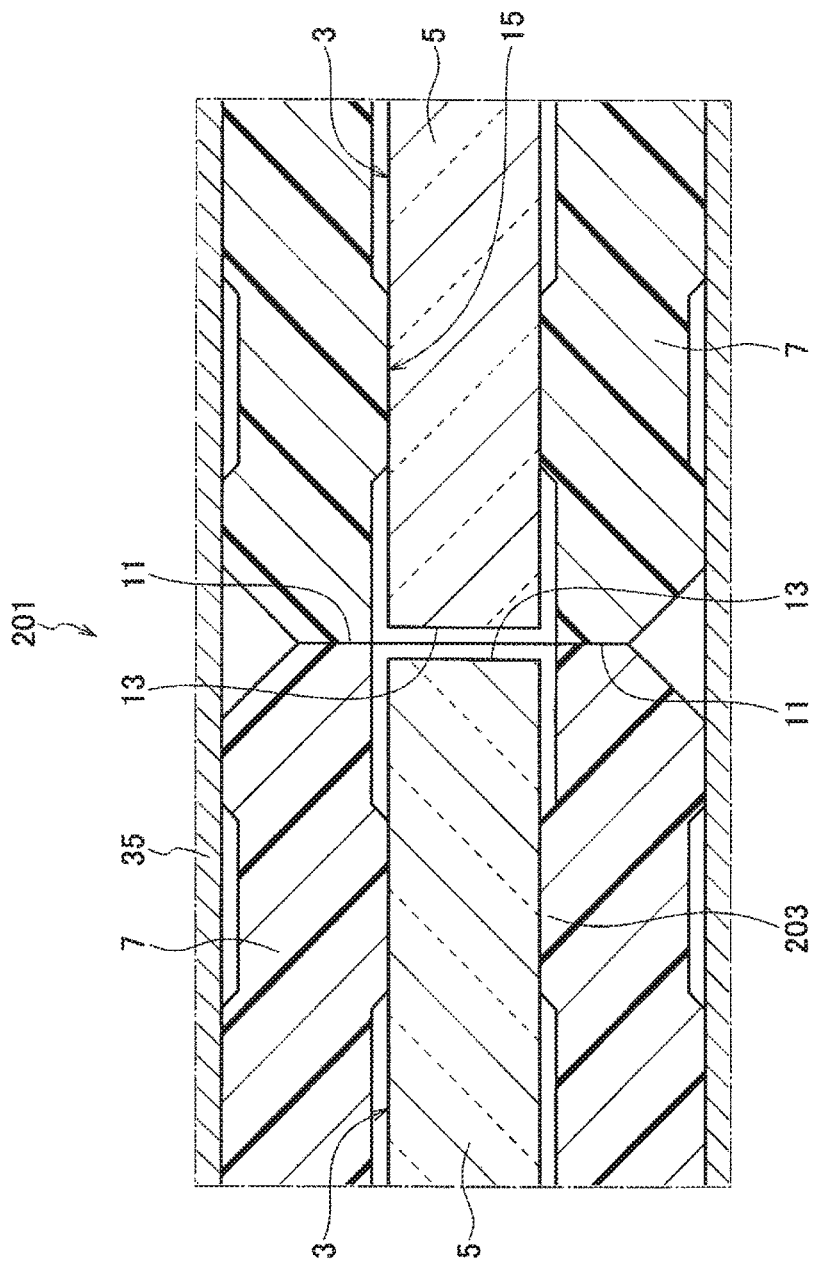
FIG. 6 is an enlarged sectional view of a main part of an optical connector according to a third embodiment of the present invention.

As shown in FIG. 6, the ferrule 7 is made of metal, and the core wire 5 is inserted into the ferrule 7 to form a ferrule assembly.

The crimp portion 203 as the fixing means 15 is provided between the outer periphery of the core wire 5 and the inner periphery of the ferrule 7 in the ferrule assembly.

The crimp portion 203 is formed on the inner periphery of a ferrule 7 which is crimped on the outer periphery of the ferrule 7 and is brought into contact with the core wire 5 by a crimp tool (not shown).

The crimp portion 203 is crimped onto the core wire 5. The crimp portion 203 fixes the core wire 5 to the ferrule 7 and fixes the position of the fiber end surface 13 with respect to the end surface 11 of the ferrule 7.

The crimp portion 203 is provided at least one position in the length direction of the core wire 5 and the ferrule 7

By fixing the position of the fiber end face 13 by the crimp portion 203 as the fixing means 15 in this manner, the number of parts is not increased by using a separate member such as an adhesive, and a large equipment such as a welding apparatus is also not required.

In the optical connector 201, the crimp portion 203 as the fixing means 15 has which is crimped from the outer periphery of the ferrule 7 and is brought into contact with the core wire 5. Accordingly, there is no increase in the number of parts, the position of the fiber end face 13 can be fixed with a simple operation, and the assembling property can be improved.

In the optical connectors according to the embodiments of the present invention as described above, the fixing means includes any one of the welding portion, the adhesion portion, and the crimping portion, each of which is independently (separately) provided. However, the present invention is not limited to these embodiments. Specifically, the fixing means may include all of, or any two of the welded portion, the bonded portion, and the crimped portion with a combination.

As shown in FIG. 7, the core wire 5 having a primary coating 37 integrated on the outer periphery of the core wire 5 may be inserted into the ferrule 7. The core wire 5 with the primary coating 37 may be inserted into the ferrule 7, and may be fixed to the ferrule 7 by the fixing means 15 and the position of the fiber end face 13 may be fixed.

What is claimed is:

1. An optical connector comprising:
   an optical fiber;
   a ferrule provided at an end of the optical fiber, through which a core wire of the optical fiber is inserted;
   a housing configured to accommodate the ferrule;
   a fiber end face provided at an end of the core wire of the optical fiber, located inside the ferrule from an end face of the ferrule in response to the core wire being inserted through the ferrule; and
   a welded portion configured to fix the core wire of the optical fiber to the ferrule and to fix a position of the fiber end face by welding such that the welded portion is comprised by melting at least one of a material of the ferrule and a material of the core wire in an area between an outer periphery of the core wire and an inner periphery of the ferrule, wherein
   the welded portion is configured to fix the core wire of the optical fiber and the ferrule to each other.

2. The optical connector according to claim 1, wherein the welding comprises laser welding and the welded portion is configured to fix the core wire of the optical fiber and the ferrule to each other by the laser welding.

3. The optical connector according to claim 1, further comprising a split sleeve into which the ferrule is at least partially inserted, wherein the welded portion is provided in a range of the split sleeve in a longitudinal direction of the optical connector into which the ferrule is at least partially inserted.

4. The optical connector according to claim 1, further comprising a crimp portion which abuts to the core wire of the optical fiber by crimping the outer periphery of the ferrule and is provided in at least one position in a length direction of the core wire and the ferrule.

\* \* \* \* \*